United States Patent [19]

Ament et al.

[11] Patent Number: 4,653,315
[45] Date of Patent: Mar. 31, 1987

[54] ENGINE TOP DEAD CENTER LOCATING METHOD

[75] Inventors: Frank Ament, Rochester; Richard A. Peden, Livonia; Pamela I. Labuhn, Mt. Clemens, all of Mich.

[73] Assignee: General Motors Corporation, Detroit, Mich.

[21] Appl. No.: 855,653

[22] Filed: Apr. 25, 1986

[51] Int. Cl.$^4$ .................................. G01M 15/00
[52] U.S. Cl. .................................................. 73/117.3
[58] Field of Search ............... 73/117.3, 116; 364/551, 364/550

[56] References Cited

U.S. PATENT DOCUMENTS 4,384,480  5/1983  Krage et al. .................... 73/116
4,520,658  6/1985  Ryan et al. .................... 73/117.3

Primary Examiner—Michael J. Tokar
Assistant Examiner—Robert R. Raevis
Attorney, Agent, or Firm—Howard N. Conkey

[57] ABSTRACT

A method of accurately determining the location of each cylinder top dead center position of an engine relative to a reference pulse whose location is not precisely known.

4 Claims, 9 Drawing Figures

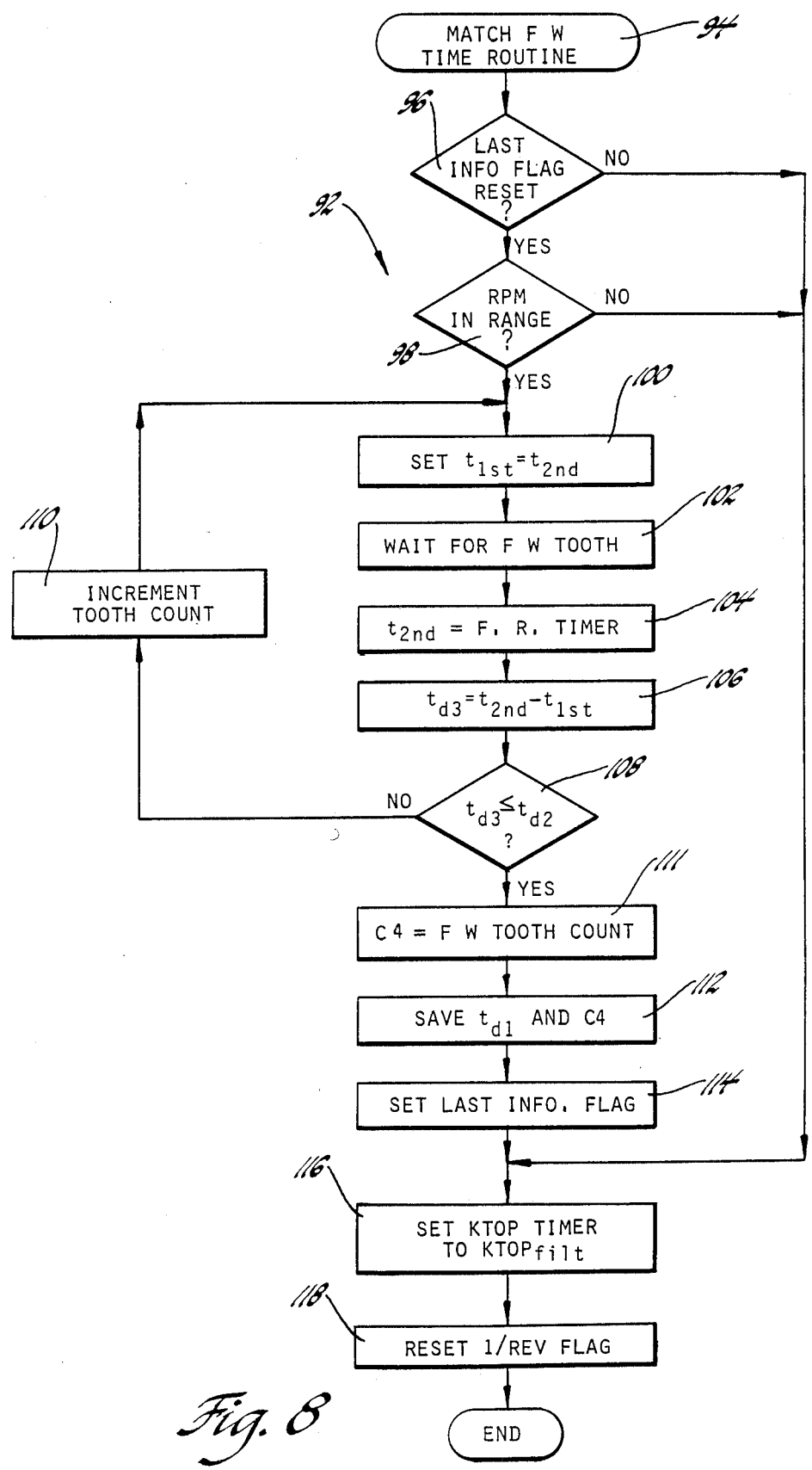

ENGINE TOP DEAD CENTER LOCATING METHOD

This invention relates to an improved system and method for accurately locating the top dead center position of an internal combustion engine.

BACKGROUND OF THE INVENTION

Accuracy in vehicle engine control parameters has become increasingly important in reducing vehicle emissions and improving economy. One of the parameters significantly affecting emissions and economy is the timing of combustion in the cylinders of the vehicle engine. In a gas fueled engine, this timing involves the crankshaft angle location of spark. In a diesel fueled engine, the timing involves the crankshaft angle location of fuel injection.

In both gas and diesel engines, the crankshaft timing angles are referenced to the engine piston top dead center position which is the exact geometric position at which the motion of the piston in the engine cylinder reverses direction and at which the combustion chamber volume is at a minimum. Therefore, the accuracy of any control or diagnostic system for establishing or monitoring combustion timing can be no better than the accuracy of the location of the piston top dead center. It is apparent, therefore, that to accurately establish or monitor engine timing requires an accurate determination of the top dead center position of the pistons.

Numerous systems have been employed for providing an indication of the crankshaft angle at which a piston reaches a top dead center position. For example, one such system employs a once-per-revolution pickup on the engine flywheel which provides a reference engine angular position relative to top dead center. This pulse in conjunction with pulses provided at small angular increments of engine rotation provide for the detection of top dead center of each piston. Typically, the pulses provided at the angular increments of engine rotation are obtained by monitoring the passing of the teeth on the engine ring gear by an electromagnetic pickup. These teeth are spaced at two to three degree intervals around the ring gear so that an electrical pulse is provided for each two to three degrees of angular rotation of the engine. The reference pulse is typically provided by a single tooth monitored by an electromagnetic pickup whose output is a signal representative of the reference engine angular position.

By sensing the passing of the tooth representing the angular reference engine position and thereafter counting ring gear teeth, the system may continuously determine the top dead center position of each piston upon rotation of the engine. However, the accuracy of this type of system is limited by the accuracy in which the reference tooth was positioned on the engine flywheel relative to top dead center position. Further, in the case of a diesel engine wherein the reference pulse may be provided by a pickup located in the fuel pump, the accuracy of the reference pulse relative to engine top dead center position may vary considerably from the desired position thereby affecting the accuracy in the determination of engine top dead center position.

SUMMARY OF THE INVENTION

It is well known that an internal combustion engine generates power in a cyclic fashion and that this causes cyclic variations in the engine speed. While these speed cycles are minimized by the engine flywheel, they can easily be measured, especially at engine idle speeds. During each cylinder compression stroke, the engine speed decreases to a minimum speed that substantially coincides with a corresponding piston top dead center position and thereafter increases during the power stroke of the engine.

A characteristic of the engine speed waveform is that it is substantially symmetrical within a small angular range around top dead center position of the piston. This speed symmetry is utilized in accord with the principles of this invention in precisely determining the top dead center position of each piston of an internal combustion engine.

In accord with this invention, the speed of the engine is measured before top dead center position of a piston at a measured engine angular position relative to the position of a reference signal that is generated at the same (though not precisely known) angular position of the engine during each engine rotation. In one embodiment, the known engine angular position relative to the position of the reference signal at which the engine speed is measured is adaptively adjusted during engine operation so that the speed measurement is taken before top dead center within the angular range where the engine speed waveform is symmetrical about the piston top dead center position.

From the engine angular position at which the speed measurement is taken, the angle of engine rotation is measured as the engine speed decreases to a minimum substantially at the piston top dead center position and thereafter increases to the same speed and greater than previously measured at the known engine angular position relative to the position of the reference signal. Since the engine speed is substantially symmetrical about the piston top dead center, the piston top dead center position is substantially one half of the measured engine angular rotation from the known engine angular position relative to the reference signal. Top dead center position relative to the reference pulse is then precisely determined by summing the known engine angular position relative to the position of the reference signal and an empirically determined fraction, such as one half, of the measured engine rotation between the matching measured speed points.

In one aspect of this invention, the reference pulse provided with each rotation of the engine is provided by the fuel pump driven by the diesel engine. Two teeth spaced 180° apart are located on the driven portion of the fuel pump, which rotates at one half the speed of the engine, so as to establish the reference position during each engine rotation at an engine angular position substantially before top dead center position of a cylinder and at the most non-reactive part of the cycle so as to minimize variations in the periodic generation of the once-per-cycle reference pulse due to factors including drive train lash. This location may be substantially outside of the engine rotational range around top dead center position wherein there is substantial speed symmetry. Since the pump only produces a reference pulse at a non-reactive cycle position and angular displacement is determined from engine flywheel teeth, the pump to engine phasing can be determined very accurately no matter what the pump engine relationship is during the remainder of the cycle. In this aspect of the invention, a software reference signal is provided within the range wherein there is speed symmetry around top dead center position of the cylinder and from which the precise location of top dead center is determined as before described.

DESCRIPTION OF THE DRAWINGS

FIGS. 5 through 9 are flow diagrams illustrating the operation of the control unit of FIG. 1.

DESCRIPTION OF THE PREFERRED EMBODIMENT

Figure 1:
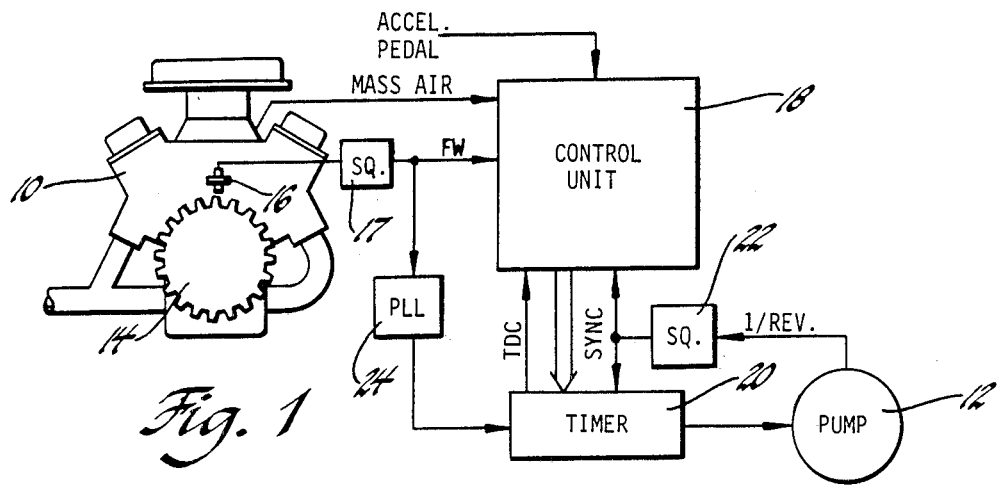
FIG. 1 generally illustrates an engine and a control system therefor that determines the engine top dead center position in accord with the principles of this invention.

The preferred embodiment of this invention is described with respect to an eight cylinder diesel engine 10 having a fuel pump 12 rotated thereby for injecting fuel to the individual cylinders. The fuel pump 12 is a known form of pump that includes a solenoid energized in timed relationship to the engine position so as to control the timing and quantity of fuel injected into the individual cylinders.

The engine 10 includes a flywheel 14 having teeth spaced around its periphery at, for example, three degree intervals. An electromagnetic sensor 16 is positioned to sense the teeth on the flywheel 14 as it is rotated by the engine crankshaft. The output of the sensor 16 is provided to a squaring amplifier 17 whose output comprises flywheel (FW) pulses that are supplied to a control unit 18 at each three degrees of flywheel rotation.

Control of the pump 12 to deliver fuel to the engine 10 is provided by the control unit 18 in conjunction with a timer 20. In addition to the FW pulses, the control unit 18 receives inputs from a mass air flow sensor representing the mass air flow into the engine 10 and from an accelerator pedal position sensor representing the position of a conventional operator adjusted accelerator pedal. The control unit 18 also receives a once-per-revolution sync pulse at an angular position before top dead center of one of the engine pistons and a top dead center signal (TDC) from the timer 20 at each engine piston top dead center position.

In one embodiment, the sync pulse is generated during each engine rotation by a tooth carried by the ring gear 14 and an associated electromagnetic sensor within the angular range around top dead center position of a piston wherein the engine speed is symmetrical. In the present embodiment, however, the once-per-revolution sync pulse is provided by a pulse generator within the pump 12. This pulse generator may take the form of two teeth spaced 180° apart rotated with the shaft of the pump 12 and an electromagnetic sensor, similar to the electromagnetic sensor 16, for sensing the passing of the teeth. The output of the electromagnetic sensor is then provided to a squaring circuit 22 which provides the once-per-revolution sync pulse to the control unit 18 and also to the timer 20. In other embodiments, a single tooth may be provided that is rotated by the shaft of the pump 12 to provide one pulse for each engine cycle or multiple teeth providing a pulse for each engine cylinder.

The pump 12 generates the sync pulse well ahead of the desired angular range near top dead center wherein the engine speed is symmetrical so as to avoid irregularities in the position of the sync pulse relative to the engine angular position. These irregularities are caused by factors including drive train lash. Even with this precaution, the generation of the once-per-revolution sync pulse relative to the engine angular position may not be precisely known due to various machining, assembly, and installation tolerances. As will be described, this invention provides for accurate determination of the top dead center position of each of the pistons in the engine 10 relative to the once-per-revolution sync pulse provided by the pump 12 even though the location of the sync pulse relative to the engine position is not precisely known.

A signal having a frequency that is a predetermined multiple of the frequency of the flywheel teeth signal is provided to the timer 20 by means of a phase locked loop circuit 24. The phase locked loop circuit 24 is conventional and provides for multiplication of the flywheel teeth frequency by means of a divider in its feedback path.

Figure 2:
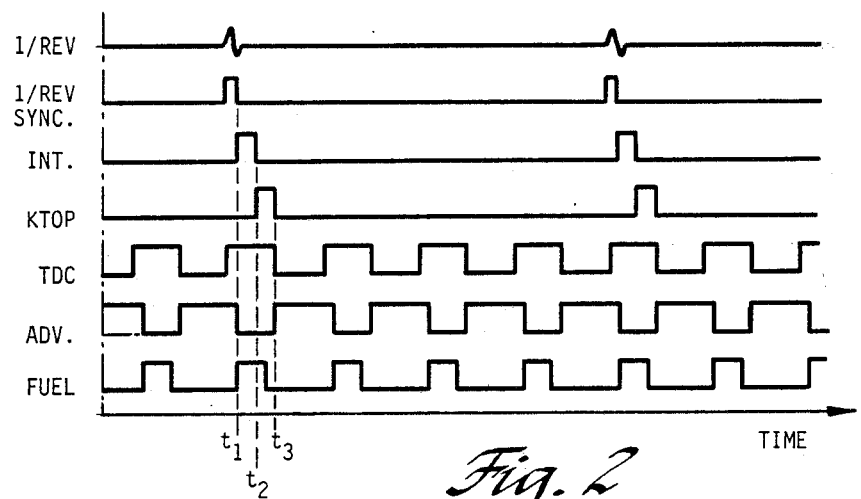
FIG. 2 is a timing diagram of various signals generated in carrying out the principles of this invention.
Figure 3:
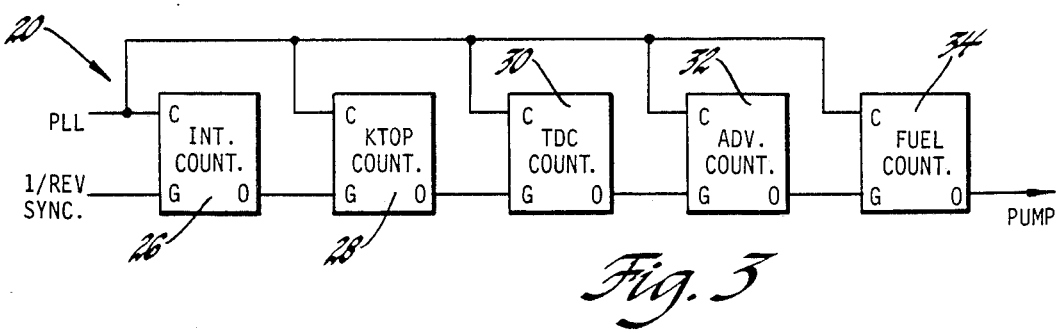
FIG. 3 is a diagram of the timer of FIG. 1.

The operation of the system of FIG. 1 for controlling the input to the pump 12 so as to provide fuel injection timed precisely to engine top dead center position is illustrated in the timing diagram of FIG. 2 with reference to the schematic of the timer 20 in FIG. 3. The timer 20 of FIG. 3 is comprised of individual counter circuits 26 through 34 each being clocked by the pulse output of the phase locked loop 24. The counters 26 through 34 are each enabled to time or count a predetermined interval based on an engine rotation angle represented by a predetermined number of phase locked loop pulses by an edge trigger provided to its gate input.

The duration timed or counted by each of the counters 26 through 34 is established by the control unit 18 which periodically sets an engine angular rotation value in terms of a predetermined number of phase locked loop pulses into the respective counter. Additionally, the counters 26 through 34 are selectively set into either (1) a single shot mode wherein the number set therein by the control unit 18 is counted only once in response to a trigger signal or (2) a continuous mode wherein the number set therein by the control unit 18 is repeatedly counted.

Referring to FIGS. 2 and 3 combined and beginning with the generation of a reference pulse in the form of a once-per-revolution pulse output of the pump 12, the once-per-revolution sync pulse is generated once each engine revolution by the squaring amplifier 22. The counter 26 set in a single shot mode is enabled by the trailing edge of the sync pulse at time $t_1$ to generate an interrupt pulse at its 0 output having a duration from $t_1$ to $t_2$ determined by a predetermined rotational angle defined by a predetermined number of phase locked loop pulses to be counted and which is set therein by the control unit 18. As will be described, the engine angular rotation represented by the interrupt pulse is adaptively adjusted so that its trailing edge is before piston top dead center within the angular range where the engine speed waveform is symmetrical about top dead center. This trailing edge functions as an interrupt for the program executed by the control unit 18.

The counter 28 set in a single shot mode is enabled by the trailing edge of the interrupt pulse at time $t_2$ from the counter 26 to generate a KTOP pulse at its 0 output having a duration from $t_2$ to $t_3$ determined by a predetermined number of phase locked loop pulses to be counted and which is set therein by the control unit 18. As will be described, the number of phase locked loop pulses establishing the duration of the KTOP pulse is determined in accord with this invention so that the trailing edge of the KTOP pulse occurs at the piston top dead center position.

The counter 30 set in a continuous mode is initialized by the trailing edge of the KTOP pulse at time $t_3$ from the counter 28. The 0 output of the counter 30 thereafter changes state at each 45 degrees of rotation of the engine 10 beginning with a high-to-low transition at the trailing edge of the KTOP pulse. In this respect, the number of phase locked loop pulses permanently set into the counter 30 is the number of pulses in 45 degrees of engine rotation so that the high-to-low transition of the TDC pulses occurs at 90 degree intervals at each piston top dead center position of the engine 10.

The counter 32 set in a single shot mode is enabled by the high-to-low transitions of the top dead center signal from the counter 30 to generate an advance pulse at its 0 output having a duration determined by a predetermined number of phase locked loop pulses representing a desired injection timing angle to be counted and which is set therein by the control unit 18.

The counter 34 set in a single shot mode is enabled by the trailing edge of the timing signal from the counter 32 to generate a fuel pulse signal at its 0 output having a duration determined by a predetermined number of phase locked loop pulses representing a desired injection fuel quantity. This number is set into the counter 34 by the control unit 18 based on factors including the mass air flow into the engine 10 and the position of the accelerator pedal.

Figure 4:
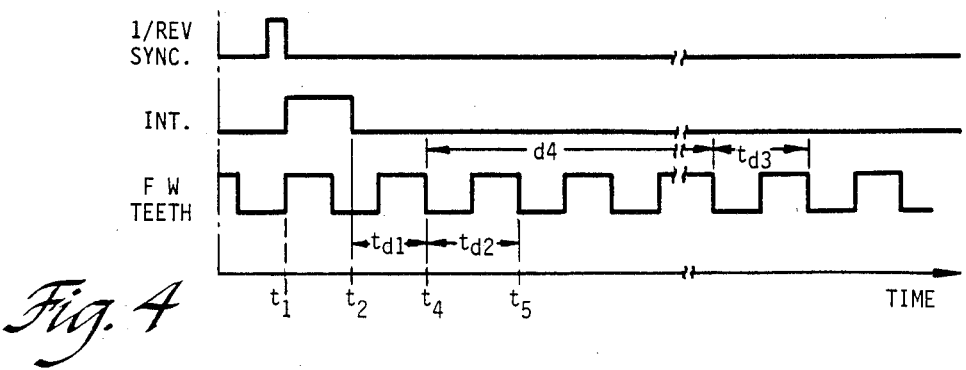
FIG. 4 is a timing diagram illustrating the determination of the location of engine top dead center position relative to an engine reference position.

The timing diagram of FIG. 4 illustrates the operation of the subject invention in determining the duration of the KTOP pulse of FIG. 2. The duration of the KTOP pulse is determined by the number of phase locked loop pulses representing the required angular rotation of the engine 10 from termination of the interrupt pulse at the time $t_2$ to engine top dead center.

At the trailing edge of the interrupt pulse at time $t_2$, the control unit 18 functions to measure the time period $t_{d1}$ to the next flywheel tooth (each tooth being represented by a trailing edge of the output of the FW signal provided by the squaring amplifier 17). As viewed in FIG. 4, the next flywheel tooth is sensed at time $t_4$. The control unit 18 then measures the time $t_{d2}$ to the next flywheel tooth sensed at time $t_5$. The time interval $t_{d2}$ between times $t_4$ and $t_5$ in conjunction with the angular spacing of the flywheel teeth provide a measure of the instantaneous engine speed.

The control unit 18 then counts flywheel teeth while monitoring the instantaneous engine speed represented by the time between consecutive flywheel teeth as the engine speed decreases to engine top dead center position and thereafter increases and until the time $t_{d3}$ between consecutive flywheel teeth becomes equal to or less than the time $t_{d2}$ representing matching speeds on each side of top dead center. From the foregoing information, the precise location of engine top dead center position relative to the termination of the interrupt pulse at time $t_2$ can be determined.

The engine top dead center position relative to the interrupt pulse is equal to the engine angular rotation over the time period $t_{d1}$ (which can be determined from the engine speed based on the time interval $t_{d2}$) and one-half of the engine angular rotation $d_4$ between the matching engine speed points on each side of top dead center. This value in phase locked loop pulses defines the KTOP pulse duration that is inserted into the timer 28 of FIG. 3 by the control unit 18.

The control unit 18 of FIG. 1 takes the form of a digital computer of standard configuration that includes a central processing unit, a random access memory, a read-only memory, a non-volatile memory, an input-/output unit, an analog-to-digital converter and a clock. The operation of the control unit 18 is provided by means of a program permanently stored in the read-only memory and which is repeatedly executed for determining the engine top dead center position and for controlling the fuel delivered by the pump 12. FIGS. 5 through 9 are flow diagrams illustrating the operation of the program in carrying out the principles of this invention and for controlling the pump 12.

Figure 5:
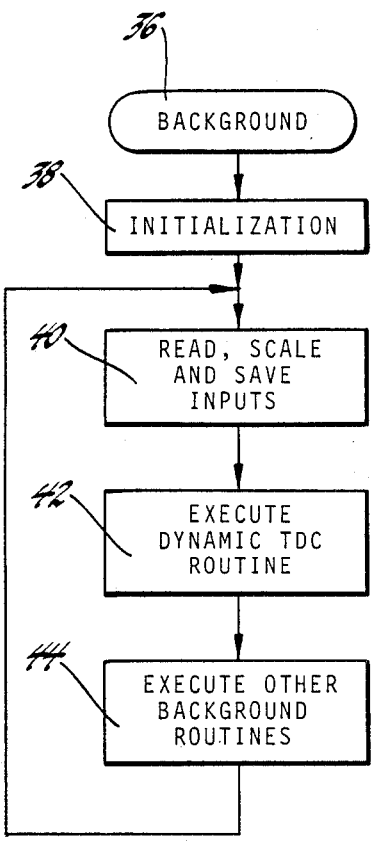

Referring to FIG. 5, when power is first applied to the engine control unit 18 such as by operation of the vehicle ignition switch, the program proceeds to a background loop beginning at step 36 and which then proceeds to a step 38 where the computer provides for system initialization. For example, at this step, initial values stored in the read-only memory are entered into the random access memory and counters, flags, and timers are initialized.

Following the initialization, the program then proceeds to a program loop that is continuously repeated. This loop includes a step 40 at which the various inputs to the control unit are read, scaled and saved in memory. These inputs include the mass air signal and the accelerator pedal position. Following step 40, a dynamic top dead center routine is executed at step 42. This routine determines the number of phase locked loop pulses defining the duration of the KTOP pulse and also the number of phase locked loop pulses defining the duration of the interrupt pulse provided by the counter 26. This routine will be described in detail with respect to FIG. 9. Next the program proceeds to a step 44 where other background routines are executed. These routines may include, for example, system diagnostic routines. Following step 44, the program returns to step 40 where the cycle is repeated.

The repeated execution of the background loop of FIG. 5 by the control unit 18 is periodically interrupted upon either the detection of the top dead center signal of the counter 30 (the trailing edge of the TDC waveform of FIG. 2) or the detection of the trailing edge of the interrupt pulse from the counter 26. When either one of these interrupt signals is detected, the program executes an interrupt routine illustrated in FIG. 6.

Figure 6:
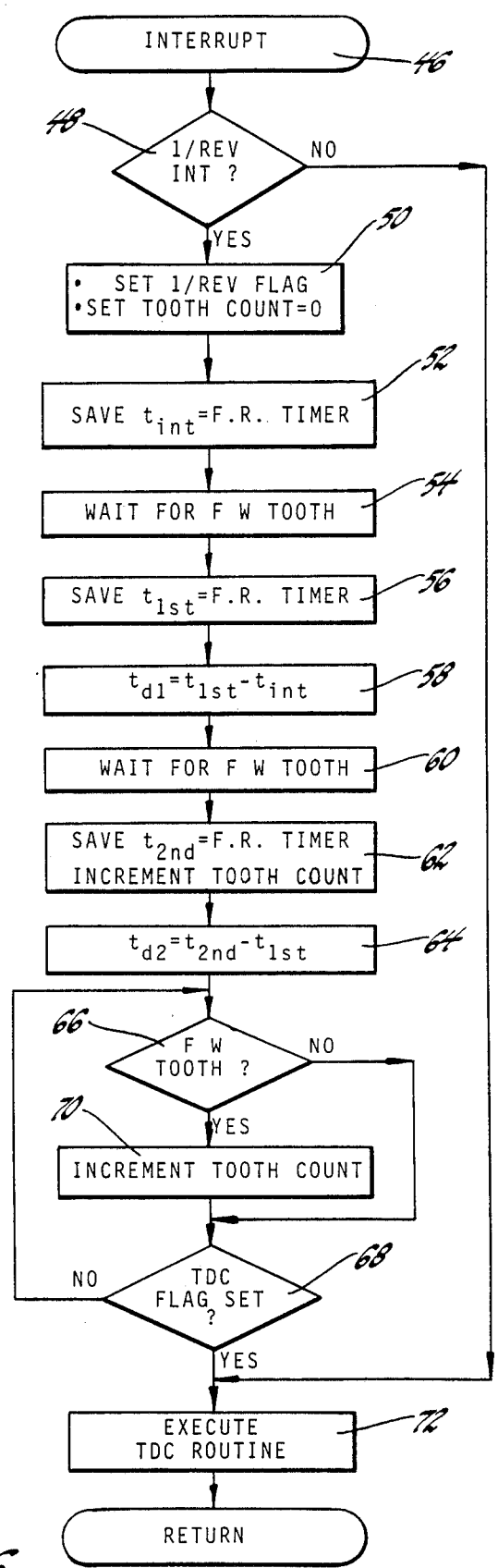

Referring to FIG. 6, the interrupt routine is entered at point 46 and proceeds to a step 48 where the program determines whether the interrupt was in response to a top dead center signal or the interrupt signal occuring once for each engine revolution. Assuming the interrupt was in response to the interrupt signal, the program proceeds then to step 50 where a once-per-revolution flag is set and the count in a tooth counting register is set to zero. Next the program executes a step 52 where the time represented by the count in a free running timer counter clocked by the control unit 18 clock is stored in memory representing the time $t_{int}$ corresponding to the time $t_2$ of FIGS. 2 and 4.

At step 54, the program waits until a flywheel tooth signal is detected which occurs at the time $t_4$ of FIG. 4. The program then proceeds to step 56 where the count in the free running timer is stored in memory representing the time $t_{1st}$. At step 58, the time $t_{d1}$ representing the difference between the time stored at step 52 and 56 is determined. This time represents the time from the interrupt pulse to the detection of the first tooth.

At step 60, the program waits for the detection of the next flywheel tooth. When detected at time $t_5$ of FIG. 4, the program proceeds to a step 62 where the count in the free running timer is again stored in memory representing the time $t_{2nd}$ and the tooth counter is incremented. At step 64, the time $t_{d2}$ between the first two teeth detected after the interrupt pulse is determined from the stored times $t_{2nd}$ and $t_{1st}$. This time in conjunction with the angular spacing of a flywheel teeth is representative of the instantaneous engine speed at some angle before top dead center of the engine piston.

The program next proceeds to a step 66 to determine whether or not another flywheel tooth has been sensed. If not, the program proceeds to a step 68 where the state of a TDC flag, set upon receipt of the top dead center signal from the timer 30 of FIG. 3, is sensed. If reset, the program returns to step 66. This cycle is repeated until a flywheel tooth is sensed at which time the program proceeds to a step 70 to increment the tooth counter.

From step 70, the program proceeds to step 68 and the steps 66, 68 and 70 are repeated as above described until a top dead center signal (the falling edge of the output of the counter 30) is sensed indicating the piston is substantially at top dead center. When sensed at step 68, the program proceeds directly to a step 72 where a top dead center routine is executed. From step 72, the interrupt routine of FIG. 6 returns to the background loop of FIG. 5.

Figure 7:
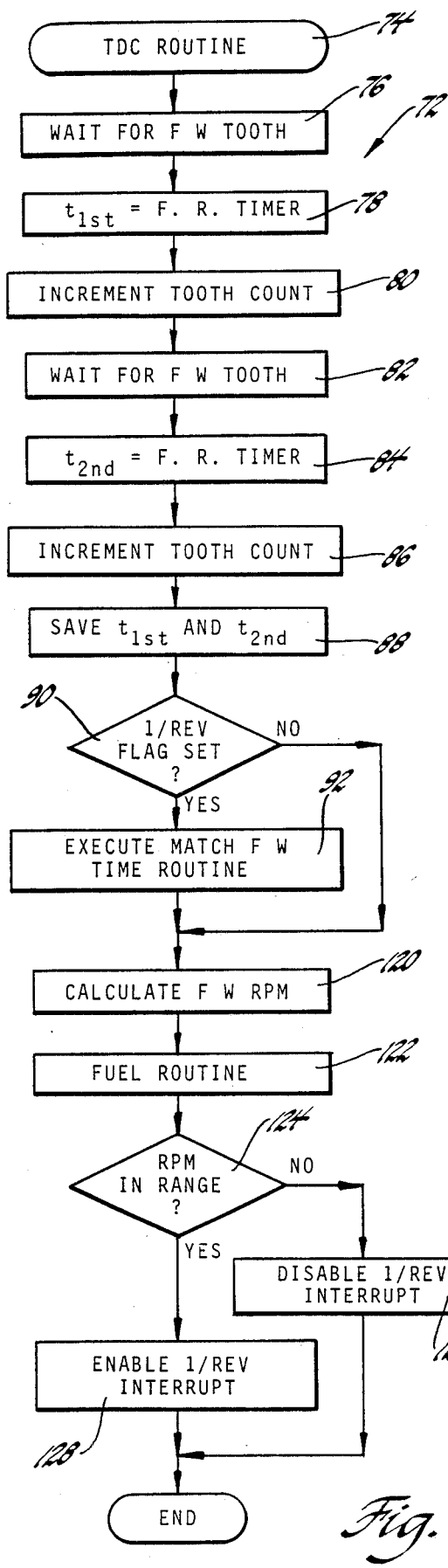

The top dead center routine 72 of FIG. 6 is illustrated in FIG. 7. This routine is entered at step 74 and proceeds to a step 76 where the program waits for the next flywheel tooth. When the next flywheel tooth is sensed, the program proceeds to a step 78 where the stored time $t_{1st}$ is set equal to the count in the free running timer. Thereafter, the tooth counter is incremented at step 80.

At step 82, the program again waits for the next flywheel tooth. When sensed, the stored time $t_{2nd}$ is set at step 84 equal to the count in the free running timer and the tooth counter is incremented at step 86. At step 88, times $t_{1st}$ and $t_{2nd}$ are saved in memory.

At step 90, the program determines whether or not the once-per-revolution flag is set. Since it was set at step 50, the program proceeds to a step 92 where a match flywheel time routine is executed. This routine is illustrated in FIG. 8.

Referring to FIG. 8, the match flywheel time routine is entered at point 94 and then proceeds to a step 96 where the state of a last information flag is sampled. When reset, the flag indicates the last determined value of the duration of the KTOP pulse has been incorporated into a filtered signal. If the flag is reset, the program proceeds to a step 98 to determine whether or not the engine speed is within a predetermined range. This speed is determined from the times $t_{1st}$ and $t_{2nd}$ saved at step 88, the difference between those times representing the time between consecutive flywheel teeth and therefore the instantaneous engine speed. If the engine speed is substantially at idle where each cyclic variation in the instantaneous engine speed is substantially symmetrical about a piston top dead center position at least within a predetermined angular range, the program proceeds to a step 100 where the stored time $t_{1st}$ is set equal to the stored time $t_{2nd}$. Thereafter, the program waits for the next flywheel tooth at step 102.

At step 104, the stored time $t_{2nd}$ is set equal to the count in the free running timer after which the time interval $t_{d3}$ equal to the difference between $t_{2nd}$ and $t_{1st}$ is determined at step 106. The time $t_{d3}$ is the time between two consecutive flywheel teeth and therefore is representative of the instantaneous flywheel speed. At step 108 this instantaneous speed is compared with the engine speed previously recorded before top dead center represented by the time $t_{d2}$ stored at step 64 of FIG. 6. If $t_{d3}$ is greater than $t_{d2}$ indicating that the engine speed after top dead center is less than the engine speed represented by the time $t_{d2}$, the program proceeds to a step 110 where the tooth counter is incremented.

The steps 100 through 110 are continually repeated to monitor the instantaneous engine speed until the engine speed becomes equal to or greater than the engine speed represented by the time $t_{d2}$ measured before piston top dead center. When this condition is sensed, the program proceeds to a step 111 where a stored value C4 is set equal to the flywheel tooth count in the tooth counter. C4 is representative of the angular rotation in terms of a number of flywheel teeth between the matching speeds represented by the times $t_{d2}$ and $t_{d3}$.

At step 112 the time $t_{d1}$ and the tooth count C4 are saved in respective memory locations. Thereafter at step 114 the last information flag is set to indicate that new information has been accumulated to be averaged into the value of the KTOP pulse.

At step 116, a KTOP$_{filt}$ value determined as will be described is set into the KTOP counter 28 of FIG. 3. Thereafter, the once-per-revolution flag previously set at step 50 is reset at step 118.

If at step 96 the last information flag was set indicating that the last sensed information had not been incorporated in KTOP$_{filt}$ value, or if the engine speed was not in the predetermined range at step 98, the program proceeds from those steps directly to the step 116.

Returning to FIG. 7, upon completion of the match flywheel time routine 92 or from step 90 if the once-per-revolution flag was in a reset state, the program proceeds to a step 120 where the program calculates the flywheel speed based on the times $t_{1st}$ and $t_{2nd}$ stored at step 88. Following this calculation, the program proceeds to a step 122 where the program determines the injection timing and the quantity of fuel required for the particular engine operating condition. For example, at this step, the quantity of fuel may be determined based on the accelerator pedal position and the mass air flow into the engine both of which were measured and stored at step 40 of the background routine of FIG. 5.

At step 124, the program determines whether or not the engine speed determined at step 120 is within the desired speed range for determining the engine top dead center position. As previously indicated, the speed range is substantially at the idle speed wherein the instantaneous engine speed is substantially symmetrical about the engine top dead center positions. If the engine is outside of the desired speed range, the program proceeds to a step 126 where the once-per-revolution interrupt is disabled. If at step 124 it is determined that the engine speed is within the desired range, the program proceeds to a step 128 where the once-per-revolution interrupt is enabled. Following either of the steps 126 or 128, the program exits the top dead center routine after which the program returns from the interrupt routine of FIG. 6 to the background loop of FIG. 5.

Following execution of the interrupt routine of FIG. 6, the values of $t_{d1}$ and C4 determined therein are utilized in the dynamic top dead center routine 42 in the background loop of FIG. 5 for determining the value of the KTOP pulse duration that establishes the top dead center position of the engine.

Figure 9:
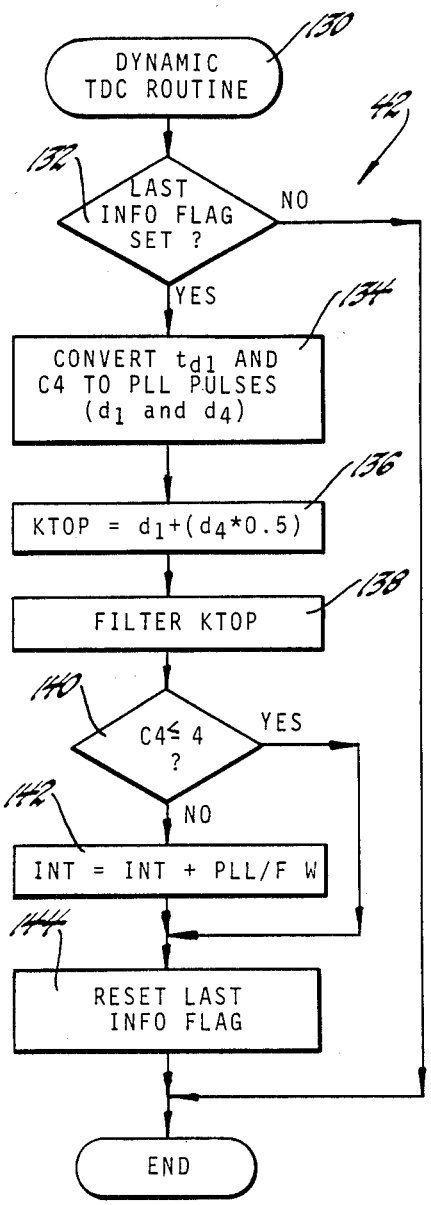

Referring to FIG. 9, the dynamic top dead center routine 42 is entered at step 130 and proceeds to a step 132 where the last information flag is sampled to determine whether or not the latest information determined in the interrupt routine has been incorporated into the average KTOP value. If the flag is set indicating that there is new information not yet used, the program proceeds to a step 134 where the value of time $t_{d1}$ and tooth count C4 are converted to phase locked loop pulses. The value of time $t_{d1}$ is converted to a number of phase locked loop pulses $d_1$ representing the angular rotation of the engine over the time period $t_{d1}$ at the engine speed based on the tooth period $t_{d2}$ determined at step 64 of the interrupt routine of FIG. 6. C4 is converted to a number of phase locked loop pulses $d_4$ based on the multiplication factor of the phase locked loop 24 of FIG. 1.

The program next proceeds to a step 136 where the value of KTOP is determined by summing the phase locked loop pulses $d_1$ with an empirically determined fraction, such as one-half, of the phase locked loop pulses $d_4$. This represents the engine angular rotation from the termination of the interrupt pulse of the counter 26 to engine top dead center position. By timing a period based on this number of phase locked loop pulses from the interrupt pulse, the top dead center position of the engine is accurately determined relative to the once-per-revolution sync pulse provided by the pump 12 even though the location of the once-per-revolution sync pulses relative to engine rotational position is not precisely known.

In the preferred embodiment, the value of the duration of KTOP is a filtered value of a number of KTOP values determined as above described. This filtered value is determined at step 138 where the latest value determined is incorporated into the filtered value $KTOP_{filt}$ which is inserted into the KTOP counter 28 at step 116 of FIG. 8.

The program next proceeds to a step 140 where the value of C4, which is the number of flywheel teeth counted between the matching speed points represented by the times $t_{d2}$ and $t_{d3}$, is compared to a constant such as 4 or, in another embodiment, a range such that $4 \leq C4 \leq 8$. C4 is selected such that the matching speed points always occur in the prescribed angular range around top dead center wherein the engine speed waveform is symmetrical. For example, if the value of C4 is greater than the constant, the program proceeds to a step 142 where the number of phase locked loop pulses defining the duration of the interrupt pulse generated by the counter 26 is increased by the number of phase locked loop pulses per flywheel tooth. By increasing the interrupt pulse by an amount corresponding to the period on one flywheel tooth, the engine angular rotation C4 will be reduced by one or two teeth during the next determination of KTOP. In this manner, the value of C4 will be adjusted so that $t_2$ occurs within the desired engine angular range around piston top dead center where the engine speed waveform is symmetrical about top dead center. In another embodiment, the value of the count defining the interrupt pulse may be decreased if C4 was less than the constant (or range) so that the value of C4 is adaptively adjusted in either direction so as to equal the constant or be within a prescribed range.

From step 142 or from step 140 if the value of C4 is equal to or less than the constant, the program proceeds to a step 144 where the last information flag is reset to indicate that the last determined information for establishing the value of KTOP has been utilized. During the next execution of the dynamic top dead center routine of FIG. 9, the program will bypass the dynamic top dead center routine of FIG. 9 by exiting the routine from step 132.

Returning again to FIG. 6, when the interrupt routine is initiated by a top dead center transition of the top dead center pulse from the counter 30, the program proceeds directly from step 48 to step 72 where the top dead center routine 72 is executed. This routine illustrated in FIG. 7 provides for the determination of the injection timing and duration to be inserted into the fuel timer 34 and the advance timer 32 to provide for control of the fuel injected by the pump 12.

In the foregoing manner, the top dead center position of each cylinder of the engine relative to a reference pulse whose position is not precisely known may be accurately determined during engine operation to enable precise timing and metering of fuel to the engine 10.

The foregoing description of a preferred embodiment for the purpose of illustrating the invention is not to be considered as limiting or restricting the invention since many modifications may be made by the exercise of skill in the art without departing from the scope of the invention. For example the location of top dead center of each piston can be determined by alternative methods, phase locked loop pulses may be counted instead of flywheel teeth or clock pulses, or the phase locked loop pulses may be eliminated. In the latter embodiment the various intervals are based on time, converted to angles based on engine speed and later converted back to time based on engine speed for use in establishing top dead center and fuel injection timing and duration based thereon. Further in this latter embodiment the tooth count C4 to the matching speed point may be adjusted by the fraction $(t_{d2}-t_{d3})/(t_{d5}-t_{d3})$ where $t_{d5}$ is the flywheel teeth period immediately preceding the period $t_{d3}$.

The embodiments of the invention in which an exclusive property or privilege is claimed are defined as follows:

1. A method for indicating the angular position of the output shaft of a multi-cylinder internal combustion engine corresponding to the location of the top dead center position of at least one of the cylinders, the output shaft having an instantaneous rotational velocity that undergoes cyclic changes at the combustion frequency of the cylinders and which has a minimum value substantially at the cylinder top dead center positions, the method comprising the steps of:
   generating a reference signal at a reference angular position of the output shaft before top dead center of one of the cylinders;
   generating periodic speed pulses corresponding to successive equally spaced positions of the output shaft of the engine as the output shaft rotates;
   determining the angle of rotation $d_1$ of the output shaft between the reference signal and the subsequent speed pulse;
   measuring the rotational velocity of the output shaft substantially at the time of occurrence of the subsequent speed pulse;

measuring the angle of rotation $d_4$ of the output shaft from the subsequent speed pulse to the angular position of the output shaft at which the rotational velocity of the output shaft first becomes equal to the measured rotational velocity; and indicating a cylinder top dead center position at an output shaft angular position offset from the reference angular position by an angle equal to $d_1+(d_4/k)$ where k is a predetermined constant.

2. The method of claim 1 wherein k is equal to 0.5.

3. A method for indicating the angular position of the output shaft of a multi-cylinder internal combustion engine corresponding to the location of the top dead center position of at least one of the cylinders, the output shaft having an instantaneous rotational velocity that undergoes cyclic changes at the combustion frequency of the cylinders and which has a minimum value substantially at the cylinder top dead center positions, the method comprising the steps of:

generating a reference signal at a reference angular position of the output shaft before top dead center of one of the cylinders;

generating periodic speed pulses corresponding to successive equally spaced positions of the output shaft of the engine as the output shaft rotates;

determining the angle of rotation $d_1$ of the output shaft from the reference signal to the first to occur speed pulse;

measuring the time interval $t_{d2}$ from the first to the second to occur speed pulse;

counting the speed pulses C beginning with the second to occur speed pulse until the time $t_{d3}$ between consecutive speed pulses becomes equal to or less than $t_{d2}$; and indicating a cylinder top dead center position at an output shaft angular position offset from the reference angular position by an angle equal to $d_1+(C/k)$ where k is a predetermined constant.

4. A method for indicating the angular position of the output shaft of a multi-cylinder internal combustion engine corresponding to the location of the top dead center position of at least one of the cylinders, the output shaft having an instantaneous rotational velocity that undergoes cyclic changes at the combustion frequency of the cylinders and which has a minimum value substantially at the cylinder top dead center positions, the method comprising the steps of:

generating a reference pulse before top dead center of one of the cylinders;

generating a reference signal at a reference angular position offset from the reference pulse by a predetermined rotational angle of the output shaft and before top dead center said one of the cylinders;

generating periodic speed pulses corresponding to successive equally spaced positions of the output shaft of the engine as the output shaft rotates;

determining the angle of rotation $d_1$ of the output shaft between the reference signal and the subsequent speed pulse;

measuring the rotational velocity of the output shaft substantially at the time of occurrence of the subsequent speed pulse;

measuring the angle of rotation $d_4$ of the output shaft from the subsequent speed pulse to the angular position of the output shaft at which the rotational velocity of the output shaft first becomes equal to the measured rotational velocity;

indicating a cylinder top dead center position at an output shaft angular position offset from the reference angular position by an angle equal to $d_1+(d_4/k)$ where k is a predetermined constant; and increasing the value of the predetermined rotational angle a predetermined amount when the value of $d_4$ is greater than a predetermined angular range around the cylinder top dead center position wherein the rotational velocity of the output shaft is symmetrical.

* * * * *